(12) United States Patent
Ferren et al.

(10) Patent No.: US 8,019,490 B2
(45) Date of Patent: Sep. 13, 2011

(54) IMAGING AND DISPLAY SYSTEM TO AID HELICOPTER LANDINGS IN BROWNOUT CONDITIONS

(75) Inventors: Bran Ferren, Beverly Hills, CA (US); W. Daniel Hillis, Encino, CA (US); Michael Harvey Peterson, Burbank, CA (US)

(73) Assignee: Applied Minds, LLC, Glendale, CA (US)

( * ) Notice: Subject to any disclaimer, the term of this patent is extended or adjusted under 35 U.S.C. 154(b) by 1030 days.

(21) Appl. No.: 11/856,557

(22) Filed: Sep. 17, 2007

(65) Prior Publication Data

US 2009/0138138 A1 May 28, 2009

Related U.S. Application Data

(60) Provisional application No. 60/827,651, filed on Sep. 26, 2006.

(51) Int. Cl.
*G01C 23/00* (2006.01)

(52) U.S. Cl. ............ 701/3; 701/4; 701/16; 701/17; 340/945; 340/951; 345/419; 345/427; 345/653; 345/654; 345/672; 345/679; 345/680

(58) Field of Classification Search ............ 701/3, 4, 701/16, 17; 340/945, 951; 345/419, 427, 345/653, 654, 672, 679, 680
See application file for complete search history.

(56) References Cited

U.S. PATENT DOCUMENTS

| 5,225,876 | A  | * | 7/1993 | Lux et al. ............ 396/109 |
| 7,365,652 | B2 | * | 4/2008 | Scherbarth ............ 340/974 |
| 2005/0168573 | A1 | * | 8/2005 | Dennis et al. ............ 348/143 |
| 2006/0016966 | A1 | * | 1/2006 | Hughes et al. ............ 250/221 |
| 2008/0117626 | A1 | * | 5/2008 | Dean et al. ............ 362/231 |
| 2008/0165533 | A1 | * | 7/2008 | Belliveau ............ 362/235 |
| 2008/0300735 | A1 | * | 12/2008 | He ............ 701/3 |

* cited by examiner

*Primary Examiner* — Khoi Tran
*Assistant Examiner* — Jordan Fei
(74) *Attorney, Agent, or Firm* — Michael A. Glenn; Glenn Patent Group

(57) ABSTRACT

An imaging and display system provides helicopter pilots with an unobstructed display of a landing area in a brownout or whiteout condition by capturing a high resolution image of the landing area prior to obscuration. Using inertial navigation information from the aircraft or an independent system, the system transforms the image to a desired viewpoint and overlays a representation of the helicopter's current position relative to the landing area. The system thus greatly improves orientation and situational awareness, permitting safe and effective operation under zero visibility brownout conditions.

19 Claims, 11 Drawing Sheets

IMAGING AND DISPLAY SYSTEM TO AID HELICOPTER LANDINGS IN BROWNOUT CONDITIONS

CROSS REFERENCE TO RELATED APPLICATION

This application claims benefit of U.S. provisional patent application Ser. No. 60/827,651, filed Sep. 29, 2006, the entirety of which is incorporated herein by this reference thereto.

BACKGROUND OF THE INVENTION

1. Technical Field

The invention relates to an imaging and display system for maintaining situational awareness when entering a dust cloud during a helicopter landing or takeoff.

2. Description of the Prior Art

Nature of the Problem

Helicopters frequently need to land in certain parts of the world where there is very fine sand and dust. Under a variety of circumstances determined by soil content and moisture, atmospheric conditions, and flight profile, the descending helicopters aerosolize this sand and dust with the downwash air stream from their rotor blades. Fine-grained dust and sand can stay aloft for up to 30 minutes after a landing. The resulting dust clouds create very dangerous low/zero visibility conditions at an extremely mission-critical time. This has resulted in the inability of the crew to execute their mission, damage to equipment, injury, and death.

There are two types of particle movement. FIG. 1 depicts a brownout generated during landing, where particles are moved outward by downwash 10, causing a sensation among the occupants of the helicopter 12 that the helicopter is moving backwards (away from the flow). A more serious effect is that particles are picked up by the vortices 11 swirling around the rotor blade tips of the helicopter 12, which causes them to travel upward in a toroidal cloud, surrounding the rotor and drawing an obscuring curtain around the aircraft.

In a brownout condition, the rotor wash circulates the dust particles upward, causing the pilot to lose visual reference during a critical phase of flight. Dry snow conditions can cause a similar experience, called whiteout. The pilot experiences spatial disorientation and is unable to perceive the helicopter's motion accurately across the surface. This can result in a number of dangerous situations:

If the helicopter drifts laterally during landing, the landing gear can be caught on an obstruction on the ground, leading to dynamic rollover.

The dust obscures objects and personnel on the ground, raising the possibility of a collision.

If the pilot experiences disorientation on landing and attempts a go-around, he will have no references as to drift or direction of movement, and will have to transition to instruments very close to the ground.

On takeoff, the moving dust can result in spatial disorientation, and the pilot may tilt the helicopter just before takeoff, introducing the chance of dynamic rollover; or the pilot may inadvertently let the aircraft drift immediately after takeoff. The obscuration also makes it hard to see tall obstacles on the takeoff path.

The obscuration becomes acute when the helicopter's airspeed falls below effective translational lift (ETL), generally 10-20 knots, below which airspeed the helicopter begins to fly in its own recirculating downwash. Flying into a headwind delays this transition so that it occurs at a lower groundspeed. For example, if a helicopter hovers in a 20 knot headwind, it is flying above ETL even though its ground speed is zero.

Pilots can alleviate brownout through several techniques, all of which have disadvantages:

Where the landing area is a smooth, unobstructed hard surface, the pilot can make a running landing. The helicopter is landed with sufficient forward speed to remain above ETL. This is more safely done with wheeled helicopters. However, brownout-producing surfaces are typically covered with soft sand or dust and are therefore not hard enough for a safe rollout. There is a risk of hitting a buried obstruction or sand pocket while rolling forward, thus decelerating the helicopter too quickly and causing it to tip forward. Nosewheel gear configurations, such as the MH-53, are less robust for running landings than tailwheel configurations such as the UH-60.

Where brownout conditions are not too severe, the pilot can set up a stable approach and limit his control inputs as the dust kicks up. However, there remains a danger that the obscuration is more serious than expected. The pilot typically does not become aware of this until landing is imminent. Also, undetected drift can develop at the last minute.

On takeoff, pilots are trained to lift off vertically until the helicopter clears the dust cloud, and then to translate forward and to climb out. This is not always possible where the helicopter is power-limited, since it takes more power to climb out of ground effect while airspeed is below ETL than it does to stay in ground effect until ETL.

According to the US Central Command, helicopter brownout incidents in the US military alone cost $100 million per year. However, this figure was exceeded within the first few weeks of the Iraq invasion, when at least five helicopters, including three AH-64 Apaches, were destroyed in brownout conditions. In 2005, incidents included the loss of two CH-47 Chinooks with 18 troops.

Previous Approaches

Technological solutions have been proposed to deal with brownout:

Autopilot/autolanding—Several systems now in use employ inertial navigation and/or Doppler radar to judge helicopter movement over the ground and either inform the pilot of drift or automatically fly the helicopter to a hover or to landing. These systems are adequate for stopping drift, but they do not enable the pilot to have unobstructed visual contact with the landing area and any potential obstacles.

Millimeter Wave Radar—A short wave radar system scans the area in front of the helicopter for terrain and obstacles. This system lacks adequate resolution and is generally too expensive to fit to all but a small number of specialized helicopters.

Laser Radar—In operation, this is broadly similar to millimeter wave radar but with better resolution and increased cost. As with millimeter wave radar, color representations must be artificially generated, decreasing a pilot's comprehension of his surroundings.

Rotor design—Several types of helicopters have less of a brownout problem than others of comparable weight due to their rotor or fuselage design. For example, the BERP (British experimental rotor program) blade tip as used on the Westland Lynx seems to reduce tip vortices and thus dust entrainment. The rotor blades on the seven-bladed Sikorsky CH-53E have non-lifting extensions at their roots, which creates an almost dust-free bubble around the cockpit. However, it is not practical to redesign and rebuild the thousands of helicopters now in service.

SUMMARY

An imaging and display system provides helicopter pilots with an unobstructed display of a landing area in a brownout or whiteout condition by capturing a high resolution image of the landing area prior to obscuration. Using inertial navigation information from the aircraft or an independent system, the invention transforms the image to a desired viewpoint and overlays a representation of the helicopter's current position relative to the landing area. The system thus greatly improves orientation and situational awareness, permitting safe and effective operation under zero visibility brownout conditions.

DESCRIPTION

Overview

An imaging and display system to aid helicopter landings in brownout conditions provides helicopter pilots with a high resolution display of the landing zone that is updated in response to changes in helicopter position and orientation, and upon detection of additional obstacles within the landing zone. The system thus greatly improves orientation and situational awareness, permitting safe and effective operation under zero visibility brownout conditions.

To create the high-resolution display, an imager, such as a digital camera, captures an image of the landing zone and the surrounding area prior to dust cloud formation. The system generates the dynamic fly-in display by transforming the image to a desired viewpoint and displaying the helicopter's relative position.

DETAILED DESCRIPTION

Figure 1:
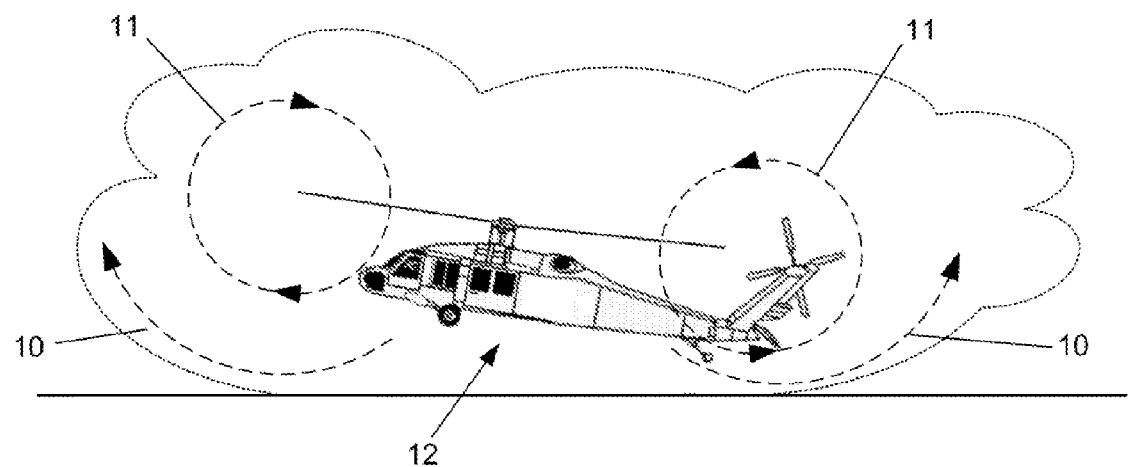
FIG. 1 depicts brownout generated during landing.
Figure 2:
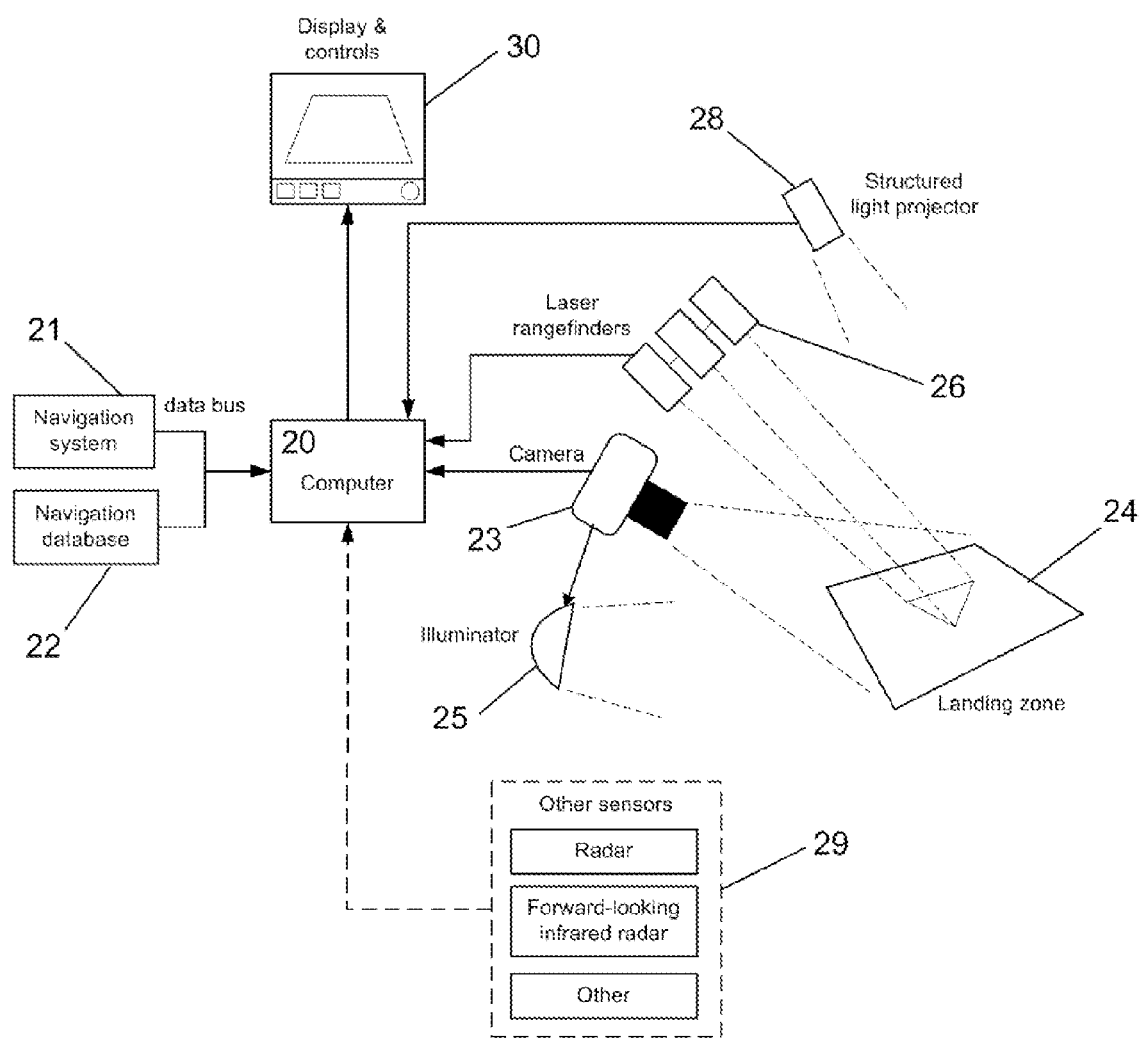
FIG. 2 depicts the basic elements of an imaging and display system to aid helicopter landings in brownout conditions.
Figure 11:
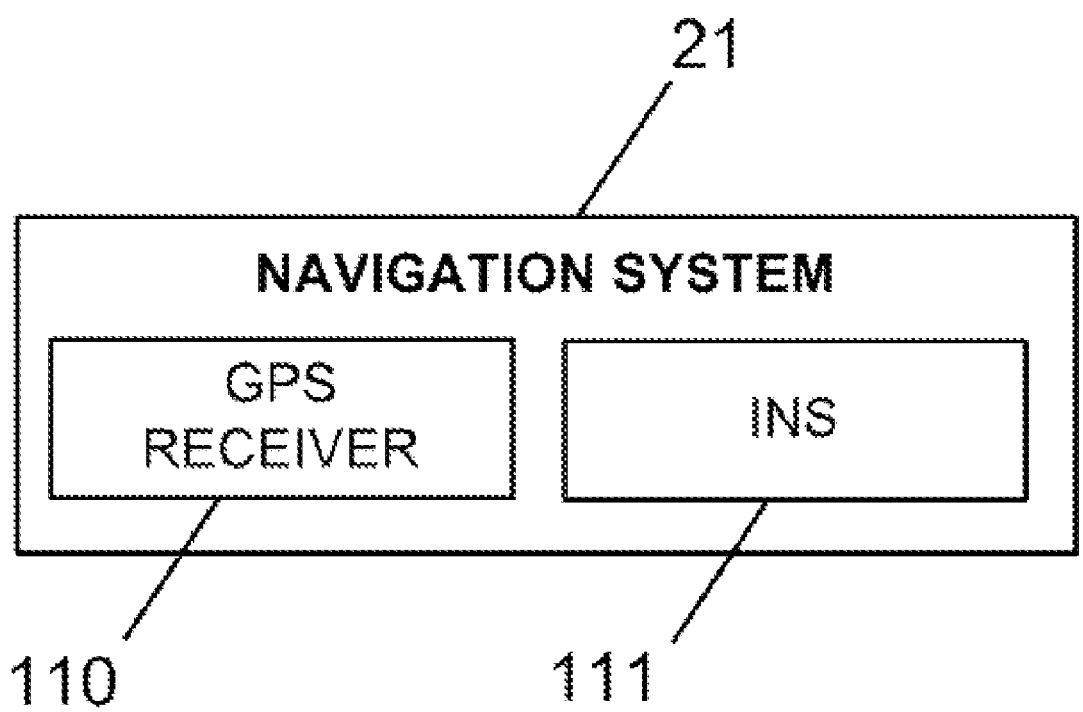
FIG. 11 depicts a navigation system from the system of FIG. 2.

An imaging and display system provides helicopter pilots with an unobstructed display of a landing area in a brownout or whiteout condition by capturing a high resolution image of the landing area prior to obscuration. Using inertial navigation information from the aircraft or an independent system, the invention transforms the image to a desired viewpoint and overlays a representation of the helicopter's current position relative to the landing area. The system thus greatly improves orientation and situational awareness, permitting safe and effective operation under zero visibility brownout conditions. FIG. 2 depicts the elements of one embodiment of the imaging and display system. The heart of the system is a processing element, such as a computer 20. Other processing elements, such as various types of logic circuit, are within the scope of the invention. The computer accepts information on the position and attitude of the helicopter from a navigation system 21. As shown in FIG. 11, this navigation system typically includes a global positioning system (GPS) receiver 110 and an inertial navigation system (INS) 111. Alternatively, the helicopter's own navigation system may be used, in which case the computer obtains the information over a data bus. In another embodiment, an independent navigation system may be used. Additional information may be obtained from the helicopter's navigation database 22, which includes the aircraft flight plan, coordinates of crew-designated landing zones, and terrain elevations. Using the data from the helicopter's navigation database assists the system in overall accuracy and in directing the image sensor to the correct location.

The processing element 20 also accepts visual information, such as digital imagery, from a sensor. In one embodiment, this sensor is a digital camera 23, which may be fixed or mounted on a gimbal. The sensor images the desired landing zone 24. For night or low-light use, a pulsed illuminator 25, such as a strobe light, is synchronized to the camera. Typically, a series of images is captured as the approach continues.

Optionally, additional sensors may be used to increase the accuracy of the camera position and to characterize slope and other obstacles. One or more laser rangefinders 26 are aligned with the camera and furnish slant range to the landing area, while an optional downward-pointing laser rangefinder or radar altimeter gives altitude information over the ground. Multiple laser rangefinders or a structured light projector 28 may be used to detect the slope of the landing area.

Other sensors 29, whether already present on the aircraft, or that are included as part of the imaging and display system, may be used to furnish or supplement imagery. These include millimeter wave radar which at certain frequencies can "see through" dust clouds in real time, or forward-looking infrared radar (FLIR) which can image the ground at night without the need for an illuminator.

Imagery obtained from the sensor or sensors is sent to the processing element 20 for processing, which involves enhancing the image, placing it in a geo-referenced 3D graphics space, overlaying additional textual and graphical information such as the helicopter's current position relative to the LZ (landing zone), and transforming the imagery to the desired viewpoint. The resulting view is shown on a display 30 in sight of the crew. Either a standalone display or an existing aircraft display of sufficient resolution may be used. Suitable controls enable the crew to activate and adjust the system.

The foregoing elements are described more fully herein below.

System Activation

Figure 3:
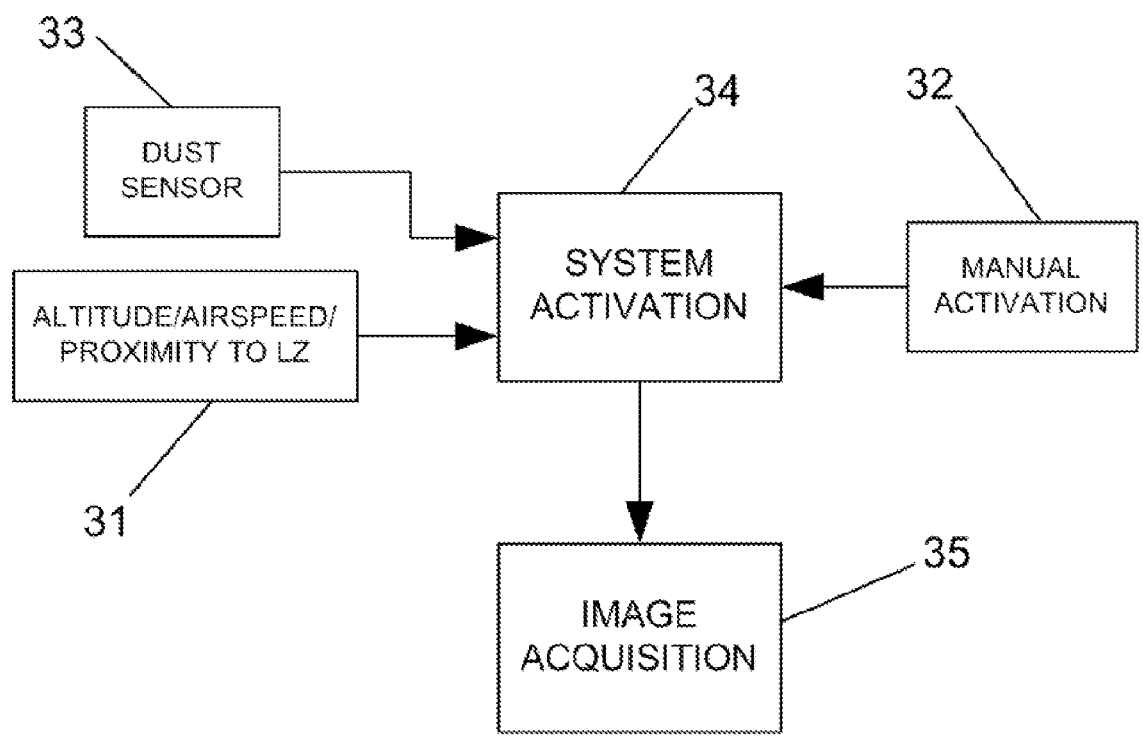
FIG. 3 provides a block diagram of a system activation sequence from the system of FIG. 2.

FIG. 3 depicts the flow of system activation.

Once placed in an armed mode by the crew, the imaging and display system preferably activates (begins image acquisition) automatically, either before or upon inception of dust cloud formation. Activation 34 can be triggered upon reaching certain altitudes and airspeeds 31 derived from the aircraft navigation system or a standalone unit. Because the altitudes and airspeeds at which dust becomes visible are well known, specific triggers can be set. For example, the sensor may be triggered if the helicopter is descending through 100 feet above ground level (AGL) and airspeed is below 40 knots. The proximity of a designated landing zone may also be considered, as obtained from the aircraft's navigation database via the data bus. The system may also be manually triggered 32 when desired. Once the system is triggered, the imaging system begins acquiring images 35 of the landing or takeoff zone.

Optionally, the system may predict dust cloud formation in advance, based on measurements of ground conditions, e.g. temperature and relative humidity, and models considering the current helicopter location and historical observations of dust cloud formation.

Alternatively, an additional sensor 33 may detect the formation of a dust cloud to begin and/or stop image acquisition. In alternative embodiments, this sensor is either a millimeter or sub-millimeter wave detector having wavelength similar to the characteristic diameter of the dust cloud particulates.

Navigation System and Database

Highly precise knowledge of the helicopter's position and attitude in space enables the imaging and display system to geo-reference the landing site and the helicopter's current position and to properly transform the image accordingly. Inputs may include the following information:

Latitude and longitude (generally obtained from GPS);
Aircraft attitude—pitch, roll and heading (generally obtained from IMU);
Altitude above ground (generally obtained from radar altimeter);
Distance to LZ (obtained from laser rangefinder);
Camera head pan and tilt angles, if head is gimballed.

Errors resulting from inaccuracies in the above inputs may lead to mis-positioning of the transformed imagery and/or helicopter position symbology. When images are captured from the typical shallow approach angles from which most approaches are made, most errors have the largest effect in the longitudinal direction (along the direction of flight). To avoid such errors, the navigation and gimbal systems are configured to meet a predetermined pitch accuracy.

On many modern helicopters the required information is readily available from the helicopter's existing navigation system, such as a GPS and inertial navigation system (INS) over a digital data bus. To avoid any interference with helicopter systems, the imaging and display system can operate in a listen-only mode, not injecting any data from the system to the helicopter. Use of the aircraft's own navigation system saves considerable cost and weight over an independent system.

For helicopters not so equipped or with insufficiently accurate systems, a standalone version of the invention is described. Additional components needed are an inertial measurement unit (IMU) with GPS updating, and optionally a vertically oriented laser or other rangefinder for altitude above ground level (AGL).

Image Acquisition—Digital Camera

In one embodiment, a high-resolution, for example a 4-16 megapixel, digital camera captures a series of images of the landing zone and surrounding terrain prior to brownout. For night or low-light acquisition, an IR-sensitive camera may be used, which may also capture images in daylight. To minimize image latency, i.e. the time between when the image is taken and when it is displayed, a camera with fast high-resolution image transfer capability to a computer is desired. Several industrial cameras have this capability, for example ⅕ second transfer time for a 11-megapixel image. The resolution of the image is sufficient to resolve finely detailed hazards such as wires. Optionally, two sensors and stereo imaging may be used to capture a three-dimensional representation of the region.

Figure 4:
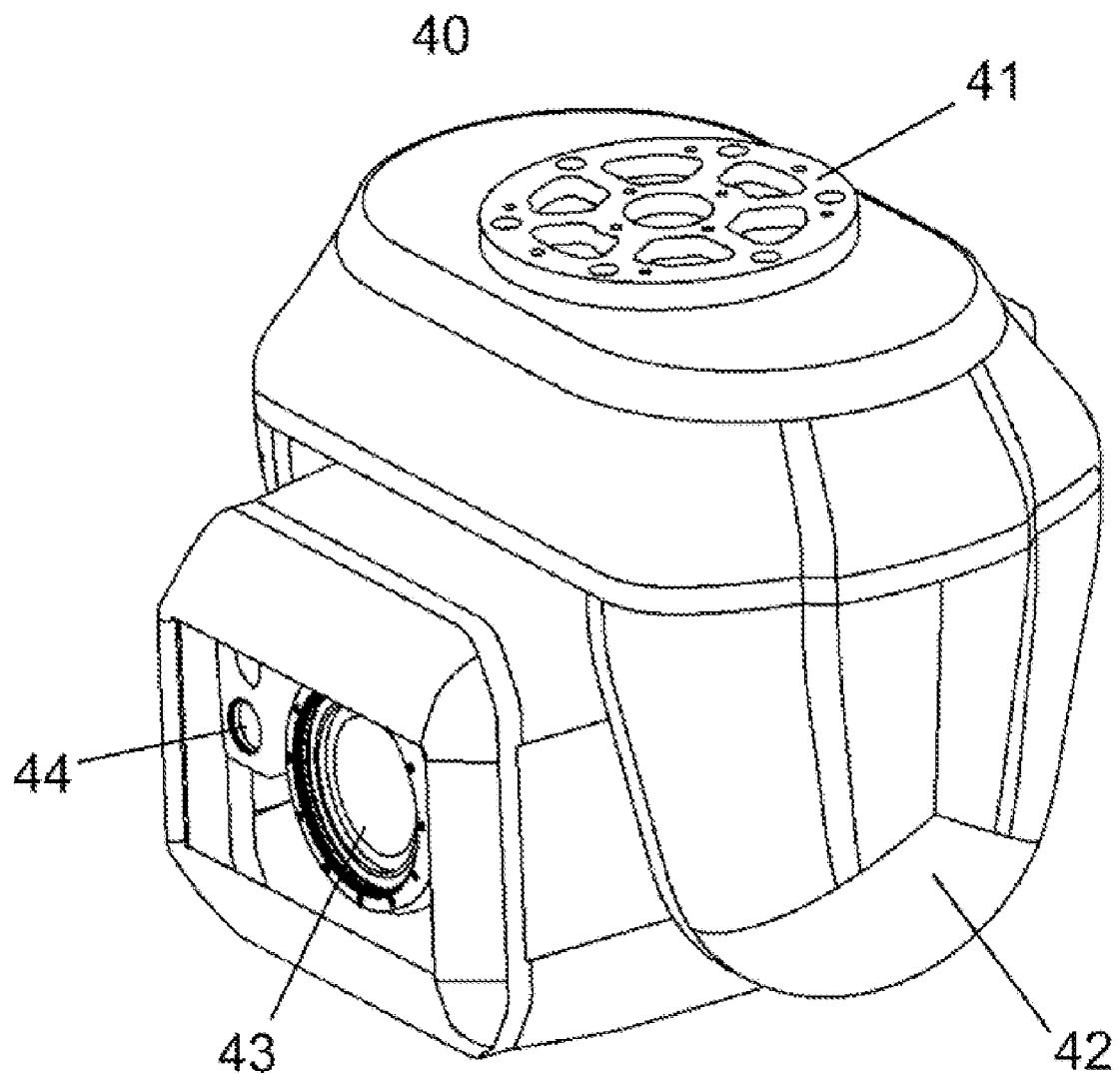
FIG. 4 depicts the sensor gimbal from the system of FIG. 2.

FIG. 4 depicts a camera mounted in a gimballed camera head 40. Since helicopters typically change attitude during an approach, the gimbal's pan and tilt axes permit the camera to track a geo-referenced location on the ground or remain aligned along the velocity vector (direction of flight). In this embodiment, the camera head is underslung from the pan axis 41 and the tilt axis 42 is contained within the vertical supports. The camera head includes apertures for a camera 43 and co-aligned laser rangefinder 44.

To save cost, weight, and complexity, the camera head may contain a tilt axis only, or be entirely fixed at an optimum angle. The latter approach may require a wider angle lens or multiple cameras to ensure coverage of the landing area at various approach angles.

Regardless of the mount, the camera head is preferably equipped with means for preventing or removing dust accumulation from the lens. These may include stowing the camera head until ready for use, a retractable cover, a spinning aperture, or air jets or wipers to remove dust.

Lens focal length is selected to provide full coverage of the desired landing area before brownout. For example, the Air Force specifies a minimum clear landing area of 150 feet square for the MH-53 helicopter. In this case, a lens focal length of 75 mm provides coverage of the landing area at 50 feet altitude at typical approach angles. Alternatively, a zoom lens may be used, generally at the cost of a smaller f/stop (maximum aperture) and therefore reduced light-gathering capability. The lens zoom, aperture, and focus may be electronically controlled by the camera, or alternately, through external motorization, for example by means of a system including belts and servo motors.

Figure 5:
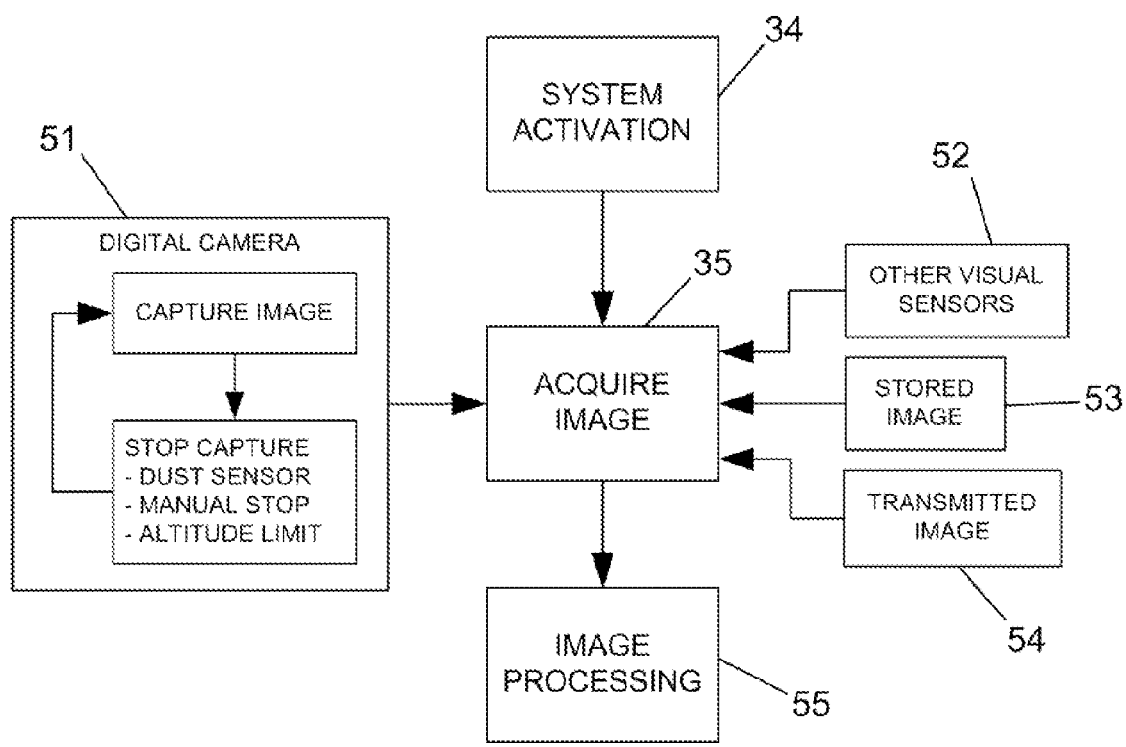
FIG. 5 depicts a schematic of system activation and image acquisition from the system of FIG. 2.

FIG. 5 depicts the steps in image acquisition. Following system activation 34, images are primarily acquired 35 using a digital camera 51, but may also be obtained through other visual sensors 52, a stored image 53, or an image transmitted from another platform 54.

Even after the first image has been captured, it is desirable to continue to take images until the last moment before the dust cloud forms, making it possible to provide the flight crew with the most accurate representation of the landing arena (including moving hazards) with the maximum possible resolution. The system may evaluate the characteristics of each image, i.e. disappearance of high-frequency details from the image indicates that dust is beginning to obscure the camera. The obscured image is discarded and the last sharp image retrieved from a buffer and used instead. Alternatively, since dust always forms at the tail first and moves forward, a fixed rearward pointing sensor may detect the loss of high-frequency imagery and direct the main camera to stop taking images. The crew may also manually stop and restart image acquisition, or capture can be stopped at a given altitude above the ground or distance from the LZ.

To reduce latency of the image, the time between when the image is taken and displayed, is reduced by using a camera with a fast transfer rate, combined with a fast graphics processor. Additionally, each new image can be projected forward in time, i.e. transformed so that at the time of display the viewpoint reflects the position of the helicopter at that instant, not necessarily the moment the image was actually taken.

Alternative Means of Image Acquisition

Besides capture using digital cameras, a number of other methods may be used to supply the digital image of the landing area:

Other sensors on the aircraft may be used, some of which may already be installed for other purposes. For example, a FLIR (forward-looking infrared) sensor can furnish long range visual information at night to furnish context in which the shorter-range photographic information is placed.

Images from previous flights into the area may be stored in the computer's memory and transformed as if the image were live. If the helicopter has an aircraft-to-aircraft data link, images may be taken from one aircraft and transferred and displayed on another aircraft in the same formation. This is especially useful in multi-ship landings, where the first aircraft landing causes brownout before subsequent aircraft have a chance to image the area. The position from which the photo was taken must be transmitted as well to allow geo-referencing.

Offboard image capture also facilitates shifting of imagery in time. For example, a daytime reconnaissance flight can provide imagery for a nighttime operation.

Geo-referenced images may also be transferred from sources such as unmanned aerial vehicles (UAVs) or other reconnaissance aircraft. A daytime reconnaissance flight may provide imagery for a nighttime operation, clearer and more covertly than acquiring them at the time of landing.

Nighttime Operation

The imager is sensitive to both visible and IR wavelengths, allowing for both daytime and nighttime operation. A servo may remove IR color correction filtration used during daytime operation from the optical pathway during nighttime operation. Optionally, separate day and night imagers may be used.

Figure 6:
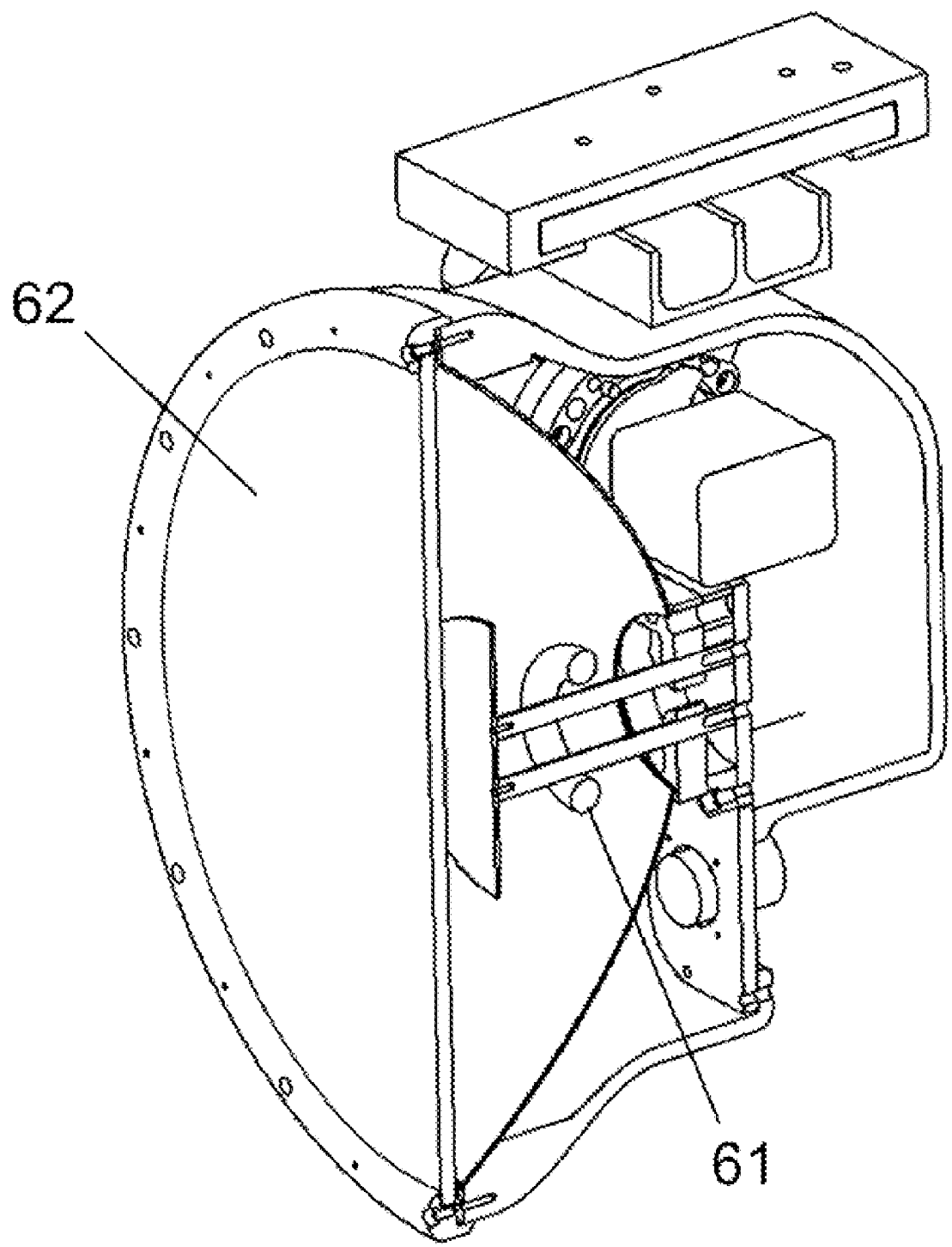
FIG. 6 depicts a pulsed illuminator for night operation from the system of FIG. 2.

FIG. 6 depicts a cross-section of an illuminator system using a pulsed strobe. The strobe head 61, typically krypton-xenon for efficient IR output, is synchronized to the camera control and has sufficient power to fully light the landing area at adequate range. A parabolic reflector 62 directs the light to the proper illumination angle. An IR-pass filter covers the reflector and prevents almost all visible light from escaping.

The illuminator may be mounted in the same housing as the camera, or in a separated, gimballed housing slaved to the camera head. Careful positioning avoids backscatter effect into the camera lens.

The imaging and display system optionally includes a visible light illumination system for use in daytime and non-covert nighttime operations. During day operations, use of an illumination system can be used to enable short exposure times (approximately 1 ms) and therefore reduced image blur.

If an intensifier is used to amplify light coming into the camera, an illuminator may not be needed for most lighting conditions.

Slope and Obstacle Sensing

Optionally, as images are being acquired, additional sensors enable 3D analysis of the landing site for slope and general terrain.

Pilots often have a hard time judging slope at the landing site until the helicopter is quite near the ground or even not until gear contact, especially where the ground is low contrast. By itself, a transformed 2D image may not show terrain contours sufficiently for the pilot to judge whether slope limits may be exceeded.

Therefore, an embodiment of the imaging and display system incorporates one or more active components to measure slope directly. These components may include one or more of the following:

Structured Light—A pattern of tightly focused light is projected onto the LZ. The distortion of the reflected pattern is analyzed by the processor, giving 3D terrain and large obstacle information. Alternatively, the pattern of the strobe on the landing site may give indications as to the contours;

Multibeam Laser—Using four laser beams or more, and with the existing knowledge of the aircraft's pitch and position in space, the slope of the landing area can be calculated by measuring the return time of the multiple lasers;

3D Imaging—Two cameras separated by a sufficient baseline characterize the scene in 3D. Placing the cameras on either side of the fuselage (about 6 feet) should be sufficient to gain contour as well as obstacle information at short distances;

Optical Flow—Since the helicopter's path through space is known, pixel-by-pixel optical flow analysis may be used to provide information on contours. In effect, a 3D image is obtained by taking photos of a fixed location from several known positions.

Image Processing

Figure 7:
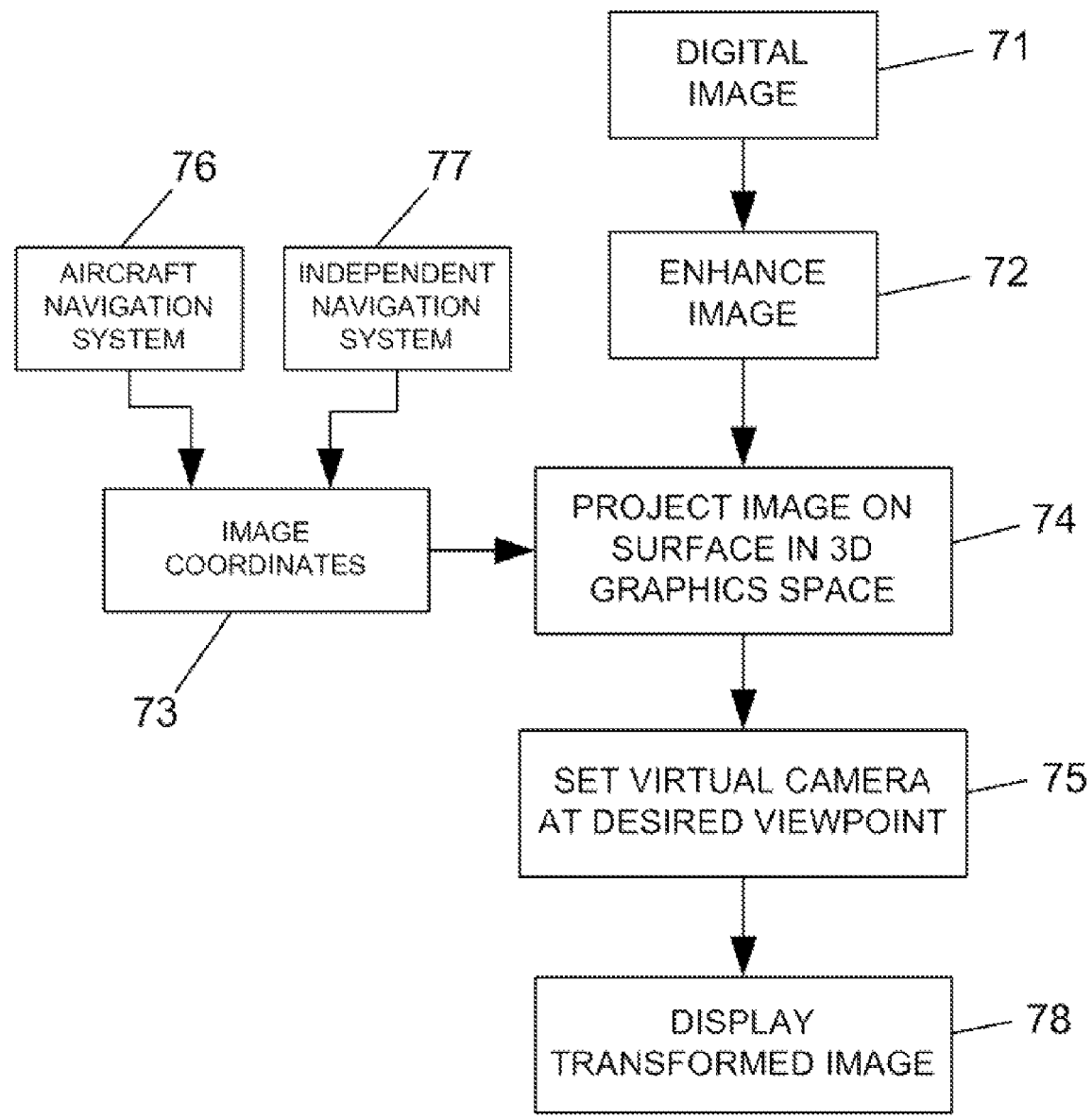
FIG. 7 depicts a schematic of image processing and display from the system of FIG. 2.

FIG. 7 depicts the process of processing each captured image. As each digital image 71 is captured or otherwise received, it is streamed to the computer for processing. The steps involved in processing may include the following:

The image is enhanced 72 as necessary to improve contrast and detail. This is particularly useful for night images, where illumination may be inadequate. For example, a non-linear transform may be applied to enhance shadow detail, boosting dark areas relative to light areas, and a sharpening algorithm applied to enhance edge detail.

Within the 3D graphics space, a virtual camera and projector are placed at the coordinates 73 which are recorded at the time of capture and derived from the navigation system. As previously explained, the system may obtain the navigation data from which the image coordinates 73 are derived from one or more navigation systems, such as an aircraft navigation system 76 and an independent navigation system 77. The image is then projected 74 as a texture onto a planar surface from that position.

The virtual camera is set to the desired viewpoint 75 to display the image 78 from any possible point in the graphics space.

As additional images are captured during the approach, the above process is repeated, and these (closer) images overlaid on previous images.

Display Symbology

Figure 8:
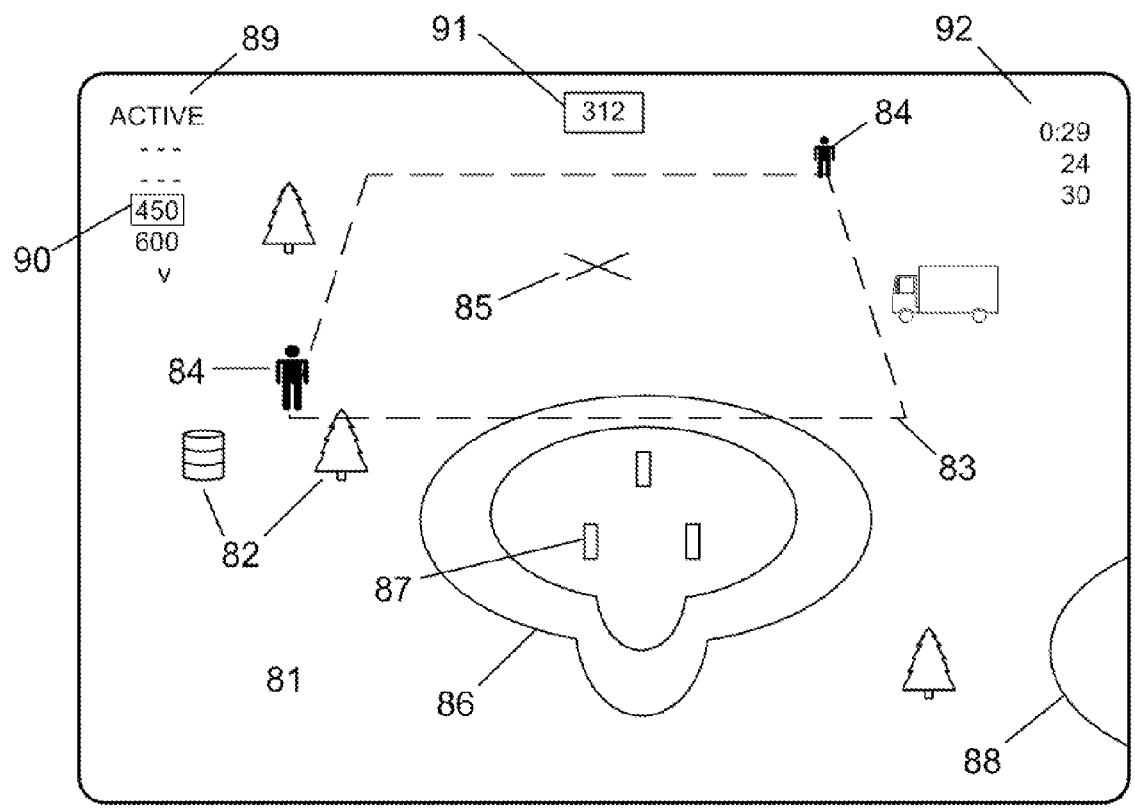
FIG. 8 depicts the display and symbology from the system of FIG. 2.

FIG. 8 depicts elements of a representative display for the aircrew. The background 81 of the display is taken up with photographic imagery, including obstacles 82. Areas outside of the limits of photographic imagery may be filled with a digital map, derived from the aircraft's terrain database, which helps place the imagery in context as the helicopter approaches.

Additional information is overlaid on this imagery. The designated landing zone, if any, is marked by a dashed box 83. Height reference markers 84 at the corners of the box, in this case the outline of a 6′ man, aid the crew in estimating height of nearby obstacles. A cross 85 shows where the aircraft's flight path vector intersects the ground plane—in other words, where the helicopter would impact the ground if no changes were made to the helicopter's current flight path. The hog, or "helicopter on ground" symbol 86, is placed under the current position of the helicopter. The symbol consists of two roughly circular, concentric shapes conforming to the diameter of the main and tail rotors, with the outer line providing a buffer zone. Rectangles 87 can be used to correspond to the location of the landing gear. If another nearby helicopter is communicating its position, its rotor diameter may be depicted 88 to maintain clearance.

Textual information is overlaid on the imagery as well. On the left side of the display, an indicator 89 tells the crew of the status of the system. Images taken during the approach may be listed on a stack 90, labeled by distance in nautical miles from the LZ. The currently displayed image is surrounded by a box. The user may select a desired image from this stack for display as an alternative to the most recent image. Other information displayed includes heading 91 and time remaining until landing, altitude, and groundspeed 92.

Display Viewpoints

Because the captured image has been placed in 3D graphics space, a virtual viewpoint can be displayed from any possible point in that space. Several types of viewpoints are described below.

FIG. 8, described above, depicts a "High 6" view. This viewpoint is placed above and behind the helicopter position along the angle of approach, giving an all-around view of the area surrounding the LZ without introducing significant distortion. By following the helicopter position at a constant distance, both the LZ and the "Helicopter On Ground" (HOG) symbol is always in view. Alternatively, a somewhat higher angle view may be selected to better view the LZ.

The "Line to fixed view" viewpoint starts out from the physical camera (helicopter) location, then travels along a straight line towards the LZ coordinates. The viewpoint comes to a stop when the LZ plus a buffer zone fills the screen, and thereafter the fixed view allows the crew to easily study the LZ for hazards. As the actual helicopter continues to approach the LZ, the HOG symbol moves in from the bottom of the screen, indicating the helicopter's position relative to the LZ.

Figure 9:
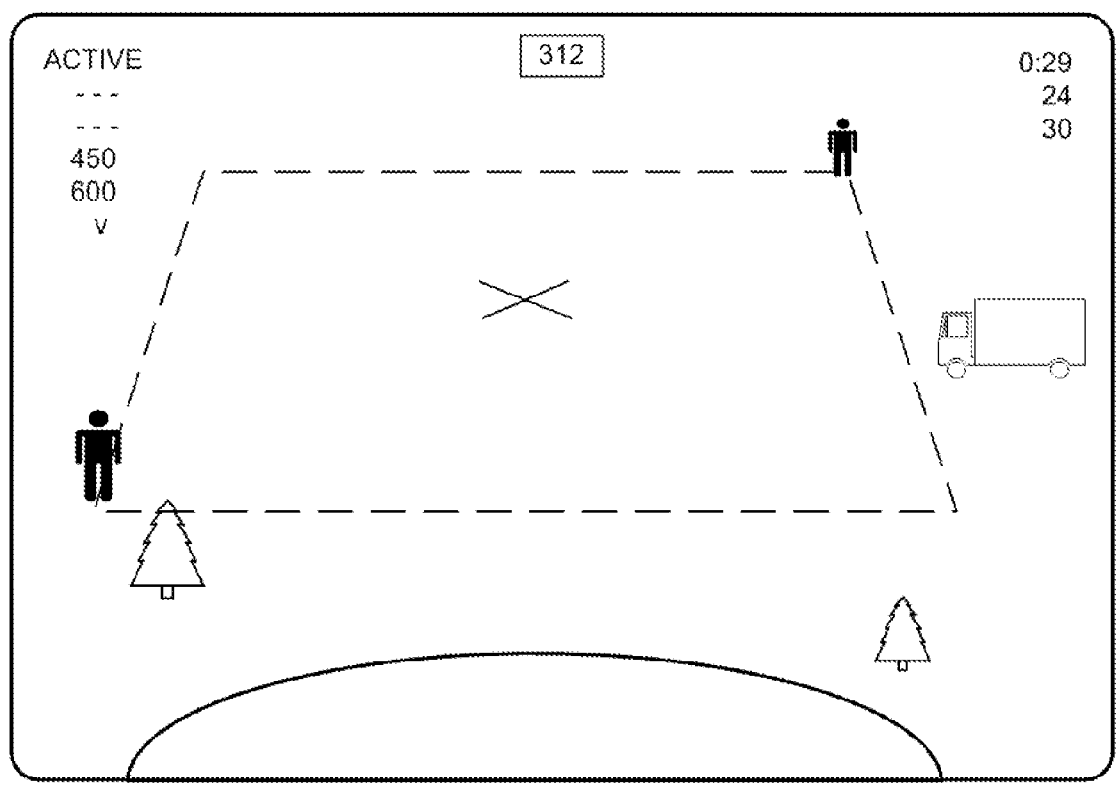
FIG. 9 depicts the display in pilots-eye mode from the system of FIG. 2.

FIG. 9 depicts the "Pilot's view" option, wherein the virtual camera is placed either at the location of the physical camera or at the position of the pilot's head. Much like a traditional flight simulator, the viewpoint follows the roll, pitch, and heading changes of the aircraft, giving a close up view of the LZ, although the area around the aircraft for main and tail rotor clearance is "behind the viewpoint and therefore not displayed.

Figure 10:
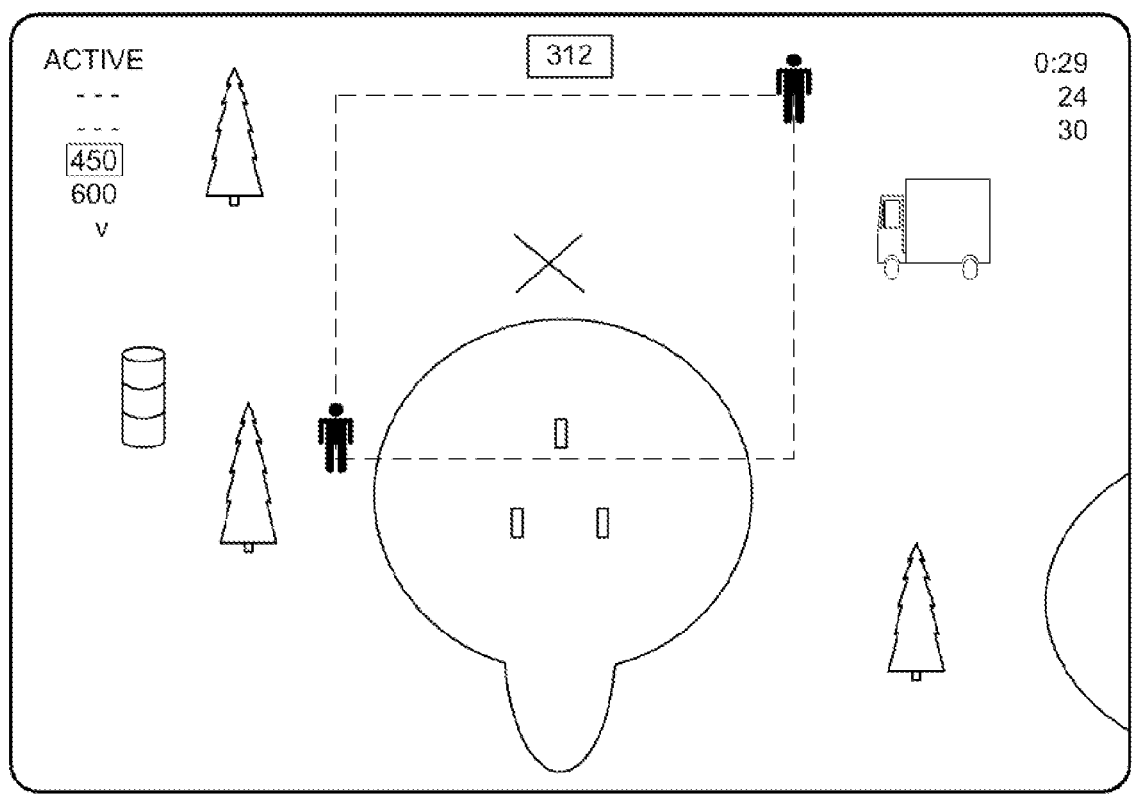
FIG. 10 depicts the display in top-down mode.

FIG. 10 depicts the "Top view" option, where the LZ is viewed from high above, directly downward, particularly useful for debugging and calibration Flat objects in the ground plane, such as runway markings, are accurately rendered. However, objects with a vertical component (such as trees) may be distorted because a 2D rendering of a 3D object is increasingly distorted the more the viewpoint angle (90°) diverges from the capture angle (about 10°).

Additional Displayed Information

Because the image obtained is of high resolution, it may be analyzed in real time to aid obstacle detection and identification. For example, the image may be analyzed for hanging cables by looking for catenary shapes between vertical elements. Any detected cables are highlighted on the display.

A colored border may be used to indicate the "age" of the image to warn the pilots that obstacles may have appeared in the interim. For example, the border may turn from green to red indicate an older and therefore less reliable image.

Iconic representations of hazards arising subsequent to image capture may also be overlaid on the high resolution image. For example, a red circle may be positioned at the location of a person that has entered the landing area. Such hazards can be detected using a combination of sensors such as millimeter wave radar (active or passive), and infrared imaging. Thus, while such sensors may not effectively image through a dust cloud, the invention makes use of the sensors in a detection role to provide the pilot with an easily interpreted, dynamic display. Additionally, tracking of pre-designated hazards and targets, indicated by RFID (Radio Frequency Identification) tags, transponders, and beacons may also be integrated.

Controls

A number of control buttons or touchscreen buttons may be provided to allow the crew to operate the system. Functions may include system on/off, automatic/manual activation, viewpoint, manual pointing, and others as needed.

Memory & Playback

All imagery and symbology is automatically recorded and saved on permanent, off-loadable memory for later review. The footage is useful for debriefing the mission and briefing subsequent missions to the same location.

Additionally, the imaging and display system can be used to take overhead reconnaissance photos of any en-route area for later use. For example, it may be desirable to image an area to aid a mission briefing for a later landing, or to collect landing imagery for a helicopter not equipped with the system.

Use on Takeoff

In addition to being used for landing, the imaging and display system may be used during takeoff in obscured conditions as well. Several crashes have occurred when pilots became disoriented upon taking off into a dust cloud. In such a case, the image is taken before the collective is raised and lift generated. The (preferably gimbaled) camera field of view is shifted to above the horizon to obtain the image.

In the foregoing specification, the invention has been described with reference to specific exemplary embodiments thereof. It will, however, be evident that various modifications and changes may be made thereto without departing from the broader spirit and scope of the invention as set forth in the appended claims. For example, while the imaging and display system has been described for use with helicopters, in actual fact, it may be used with any other vertical-takeoff-and-landing aircraft (VTOL), such as tilt-rotor aircraft or jump jets. Additionally, while an embodiment of the imaging and display system is typically deployed in low-visibility conditions such as brownouts or whiteouts, in actual fact, the imaging and display system finds application in any condition wherein an enhanced situational awareness of a VTOL's landing and takeoff zones is needed or desired. The specification and drawings are, accordingly, to be regarded in an illustrative sense rather than a restrictive sense.

The invention claimed is:

1. A system to enhance situational awareness in a vertical takeoff and landing (VTOL) aircraft, comprising:
   an element for receiving data representing an unobscured two-dimensional image of a takeoff or landing zone before the formation of a brownout or whiteout condition, wherein said element for receiving data is selected from among a group of elements consisting of: a digital camera; an infrared visual imager; an element for retrieving a stored digital camera image of said takeoff or landing zone; and an element for retrieving digital camera imagery of said takeoff or landing zone transmitted from a source external to said aircraft;
   an element for receiving navigational information;
   a processing element programmed to generate one or more enhanced images representing said takeoff or landing zone as seen from an arbitrary position by overlaying said unobscured two-dimensional image onto a virtual geo-referenced 3D graphics space and by transforming said data representing said two-dimensional unobscured image based on said navigational information; and
   an element for outputting said one or more enhanced images to a display device, wherein said display device displays one or more images depicting position of said aircraft relative to said landing zone.

2. The system of claim 1, wherein said display comprises either a standalone display or an existing aircraft display of sufficient resolution.

3. The system of claim 1, wherein said arbitrary position comprises said aircraft's current position.

4. The system of claim 1, further comprising at least one additional sensor for any of:

enhancing accuracy of positioning for any element from said group of elements;

characterizing slope and other obstacles; and detecting formation of a dust cloud to begin or stop image acquisition.

5. The system of claim 4, wherein said at least one additional sensor comprises any of:
one or more laser rangefinders aligned with said visual sensor to furnish slant range to a landing area;
a downward pointing laser rangefinder to give altitude information; and
a radar altimeter to give altitude information.

6. The system of claim 1, further comprising:
a triggering element to activate image acquisition by said system, wherein said triggering element is adjustable to trigger image acquisition at one or more of a specific airspeed, a specific altitude above ground level and proximity from a designated landing zone.

7. The system of claim 1, wherein image acquisition is manually triggered.

8. The system of claim 1, wherein image acquisition is either triggered or suspended by detection of formation of a brownout or a whiteout condition.

9. The system of claim 1, further comprising:
a component for directly measuring slope at a landing zone, wherein said component for directly measuring slope comprises one of:
means for projecting a pattern of tightly-focused light onto a landing zone, where distortion of a reflected pattern is analyzed by said processing element to provide 3D information about terrain and large obstacles;
a multi-beam laser wherein slope of a landing zone can be calculated by measuring return time of the multiple lasers;
a 3D imaging apparatus comprising two cameras separated by a sufficient baseline to characterize the landing zone in 3D; and
means for conducting pixel-by-pixel optical flow analysis to provide information on contours.

10. The system of claim 1, further comprising:
a navigation system transmitting said navigational information to said element for receiving navigational information, wherein said navigation system comprises one or both of:
said aircraft's navigation system, wherein said navigational information is transmitted to said processing element via a data signal; and
a navigation system incorporated within said system for imaging and display, said incorporated navigation system including one or both of a GPS (global positioning system) sensor and an inertial measurement device.

11. The system of claim 10, further comprising:
a navigation database, wherein said navigation database stores navigation data regarding at least said aircraft's flight plan, coordinates of crew-designated landing zones and terrain elevations.

12. The system of claim 1, wherein said navigational information comprises information regarding position and attitude of said aircraft, said navigation information including one or more of:
latitude and longitude;
altitude above ground;
aircraft attitude, including any of pitch, roll and heading;
distance to a landing zone; and
camera head pan and tilt angles, wherein pan and tilt axes permit a sensor to track a geo-referenced ground location or to remain aligned to a flight direction.

13. The system of claim 1, further comprising:
an intensifier to amplify light entering an image-capture device.

14. The system of claim 1, further comprising:
an illuminator for providing additional light for capturing image data in low-light situations.

15. The system of claim 14, wherein said illuminator comprises:
a pulsed illuminator synchronized to a visual sensor, wherein said illuminator has sufficient power to fully light said landing or takeoff zone, said illuminator further comprising a parabolic reflector to direct the light to the desired illumination angle and an IR-pass filter covering said reflector to prevent escape of visible light.

16. The system of claim 1, further comprising:
a steerable gimbal, said steerable gimbal housing said element for receiving data.

17. The system of claim 1, wherein said processing element programmed to generate one or more enhanced images representing said takeoff or landing zone as seen from an arbitrary position comprises means for:
visually enhancing said two-dimensional image data to improve contrast and detail; and
transforming said two-dimensional image data to a desired viewpoint.

18. A system to enhance situational awareness in a vertical takeoff and landing (VTOL) aircraft in a brownout or whiteout environment, comprising:
an imager for acquiring a two-dimensional digital image of a landing area before the formation of a brownout or whiteout condition, wherein said imager is selected from among a group of imagers consisting of: a digital camera; an infrared visual imager; an element for retrieving a stored digital camera image of said takeoff or landing zone; and an element for retrieving digital camera imagery of said takeoff or landing zone transmitted from a source external to said aircraft;
a system for acquiring, storing and transmitting navigational information;
a display device in view of one or more of the flight crew; and
a computer that inputs said navigational information, inputs and processes said two-dimensional digital image based on said navigational information by overlaying said two-dimensional image onto a virtual geo-referenced 3D graphics space and by transforming said data representing said two-dimensional image based on said navigational information, and outputs said processed image to said display device;
wherein said display device displays an image depicting said aircraft position relative to said landing area.

19. A method for enhancing situational awareness in a vertical takeoff and landing (VTOL) aircraft, comprising the steps of:
acquiring data representing an unobscured two-dimensional image of a takeoff or landing zone before the formation of a brownout or whiteout condition, wherein the step of acquiring is performed by a steps chosen from among a group of steps consisting of acquiring data representing an unobscured two-dimensional image from a digital camera; acquiring data representing an unobscured two-dimensional image from an infrared visual imager; acquiring data representing an unobscured two-dimensional image from an element for retrieving a stored digital camera image of said takeoff or landing zone; and acquiring data representing an unobscured two-dimensional image from an element for retrieving digital camera imagery of said takeoff or landing zone transmitted from a source external to said aircraft;

acquiring navigational information;

generating one or more enhanced images representing said takeoff or landing zone as seen from an arbitrary position by overlaying said unobscured two-dimensional image onto a virtual geo-referenced 3D graphics space and by transforming said data representing said unobscured image based on said navigational information; and displaying to a crew of said aircraft at least one of said one or more enhanced images representing said aircraft's flight path.

* * * * *

UNITED STATES PATENT AND TRADEMARK OFFICE
CERTIFICATE OF CORRECTION

| | | |
|---|---|---|
| PATENT NO. | : 8,019,490 B2 | Page 1 of 1 |
| APPLICATION NO. | : 11/856557 | |
| DATED | : September 13, 2011 | |
| INVENTOR(S) | : Bran Ferren et al. | |

It is certified that error appears in the above-identified patent and that said Letters Patent is hereby corrected as shown below:

IN THE SPECIFICATION

In Column 1, line 12, after "thereto." insert

--STATEMENT OF GOVERNMENT RIGHTS

This invention was made with Government support under contract no. FA9453-06-D-0103 awarded by the U.S. Air Force. The Government has certain rights in the invention.--

Signed and Sealed this
Twentieth Day of October, 2015

Michelle K. Lee
*Director of the United States Patent and Trademark Office*